United States Patent
Jeong

(10) Patent No.: US 10,586,536 B2
(45) Date of Patent: Mar. 10, 2020

(54) DISPLAY DEVICE AND OPERATING METHOD THEREFOR

(71) Applicant: LG ELECTRONICS INC., Seoul (KR)

(72) Inventor: Haeguen Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 15/508,848

(22) PCT Filed: Nov. 14, 2014

(86) PCT No.: PCT/KR2014/010986
§ 371 (c)(1),
(2) Date: Mar. 3, 2017

(87) PCT Pub. No.: WO2016/035933
PCT Pub. Date: Mar. 10, 2016

(65) Prior Publication Data
US 2017/0256260 A1    Sep. 7, 2017

(30) Foreign Application Priority Data

Sep. 5, 2014 (KR) .................. 10-2014-0119006

(51) Int. Cl.
*G10L 15/22* (2006.01)
*G06F 3/16* (2006.01)
(Continued)

(52) U.S. Cl.
CPC ............... *G10L 15/22* (2013.01); *G06F 3/16* (2013.01); *G06F 17/20* (2013.01); *G10L 15/26* (2013.01);
(Continued)

(58) Field of Classification Search
CPC .......... G10L 15/22; G10L 15/26; G10L 15/30; G10L 2015/223; G10L 15/063; G10L 2015/0631; G10L 15/00
See application file for complete search history.

(56) References Cited

U.S. PATENT DOCUMENTS 4,757,525 A * 7/1988 Matthews ............. H04M 3/533
379/197
6,975,993 B1 * 12/2005 Keiller .................... G10L 15/26
704/275
(Continued)

FOREIGN PATENT DOCUMENTS

CN    1746973    3/2006
CN    103714816    4/2014
(Continued)

OTHER PUBLICATIONS

PCT International Application No. PCT/KR2014/010986, International Search Report dated Apr. 30, 2015, 4 pages.
(Continued)

*Primary Examiner* — Richemond Dorvil
*Assistant Examiner* — Mark Villena
(74) *Attorney, Agent, or Firm* — Lee, Hong, Degerman, Kang & Waimey PC

(57) ABSTRACT

A display device operating method, according to one embodiment of the present invention, comprises the steps of: receiving a voice command of a user; storing the voice command, if a function of the display device corresponding to the received voice command is not stored and the voice command is received at reference frequency or more; and if the voice command is received again, performing a function of the display device corresponding to the voice command received again.

4 Claims, 8 Drawing Sheets

(51) Int. Cl.
  *G06F 17/20* (2006.01)
  *G10L 15/26* (2006.01)
  *G10L 15/30* (2013.01)
  *H04N 21/422* (2011.01)
(52) U.S. Cl.
  CPC ........ *G10L 15/30* (2013.01); *G10L 2015/223* (2013.01); *H04N 21/42203* (2013.01)

(56) References Cited

U.S. PATENT DOCUMENTS

| | | | |
|---|---|---|---|
| 9,530,405 B2* | 12/2016 | Fujii | G06F 17/2755 |
| 9,582,245 B2 | 2/2017 | Kim et al. | |
| 9,607,612 B2* | 3/2017 | Deleeuw | G10L 15/02 |
| 2006/0053009 A1 | 3/2006 | Jeong et al. | |
| 2012/0089952 A1* | 4/2012 | Song | G06F 1/1684 |
| | | | 715/863 |
| 2013/0151238 A1 | 6/2013 | Beaurpere et al. | |
| 2013/0332158 A1 | 12/2013 | Corfield et al. | |
| 2014/0006022 A1* | 1/2014 | Yoon | H04N 21/234336 |
| | | | 704/235 |
| 2014/0095176 A1* | 4/2014 | Kim | H04N 5/4403 |
| | | | 704/275 |
| 2014/0278436 A1* | 9/2014 | Khanna | G10L 21/00 |
| | | | 704/275 |
| 2014/0343950 A1* | 11/2014 | Simpson | G06F 3/167 |
| | | | 704/275 |
| 2015/0066479 A1* | 3/2015 | Pasupalak | G06F 17/27 |
| | | | 704/9 |
| 2015/0228275 A1* | 8/2015 | Watanabe | G10L 15/142 |
| | | | 704/275 |
| 2015/0255064 A1* | 9/2015 | Fujii | G06F 17/2755 |
| | | | 704/257 |
| 2015/0340031 A1* | 11/2015 | Kim | G06K 9/00302 |
| | | | 704/249 |

FOREIGN PATENT DOCUMENTS

| | | |
|---|---|---|
| JP | 2005-189287 | 7/2005 |
| KR | 10-2014-0042642 | 4/2014 |
| WO | 00/67091 | 11/2000 |

OTHER PUBLICATIONS

State Intellectual Property Office of the People's Republic of China Application Serial No. 201480081712.9, Office Action dated Feb. 11, 2019, 10 pages.

* cited by examiner

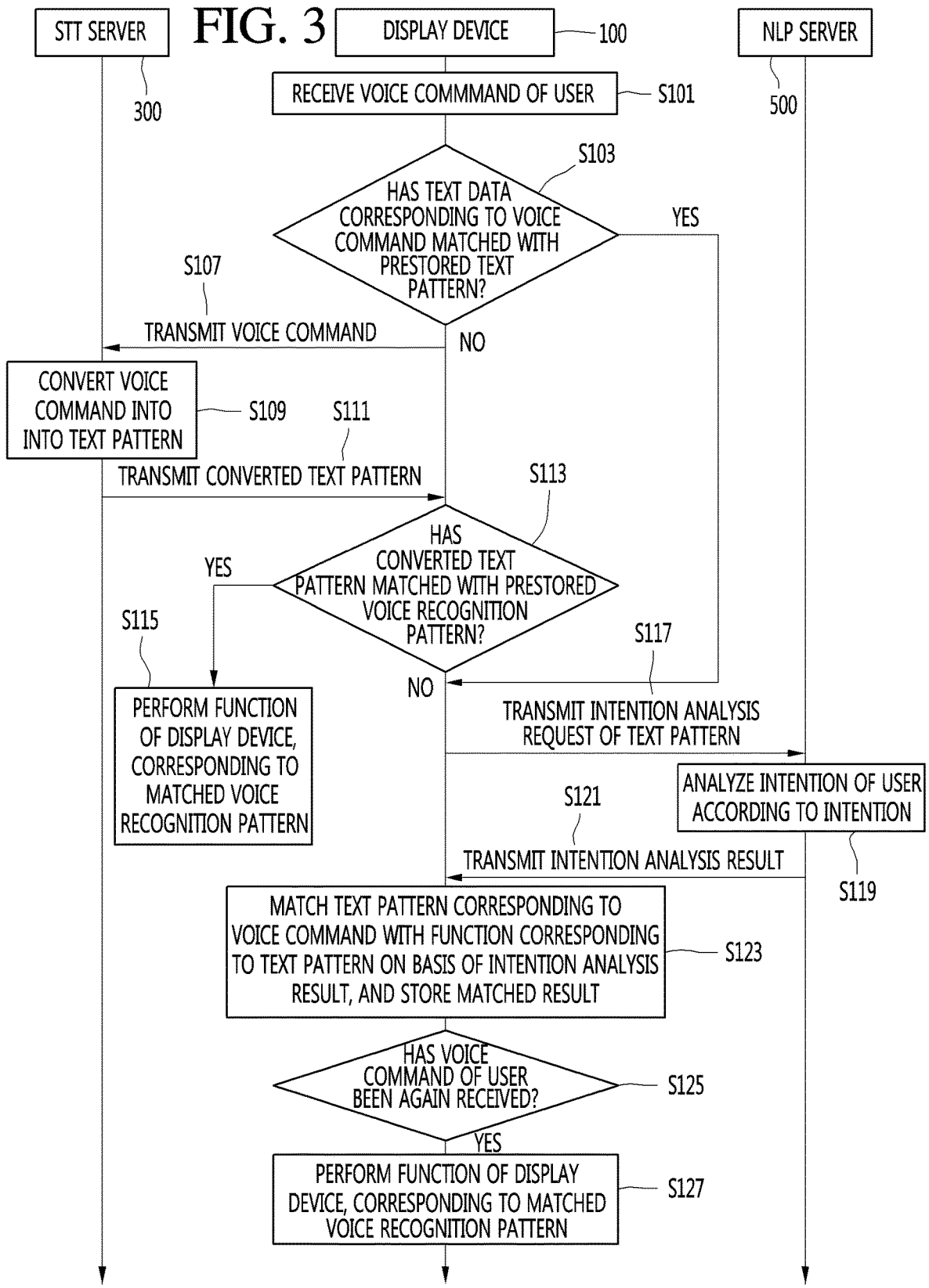

FIG. 4

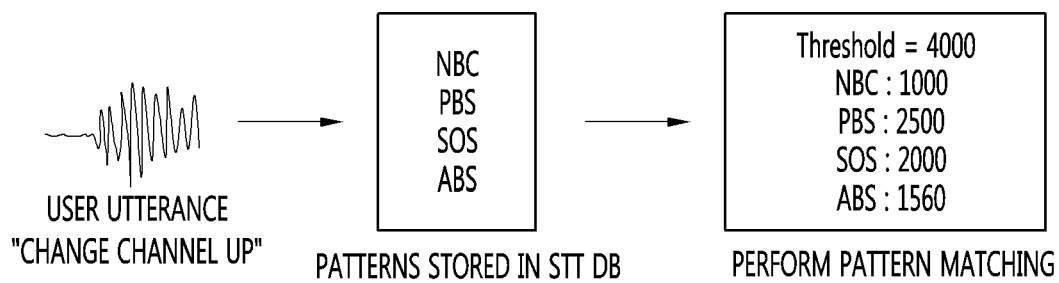

USER UTTERANCE "CHANGE CHANNEL UP" → PATTERNS STORED IN STT DB → PERFORM PATTERN MATCHING

FIG. 5

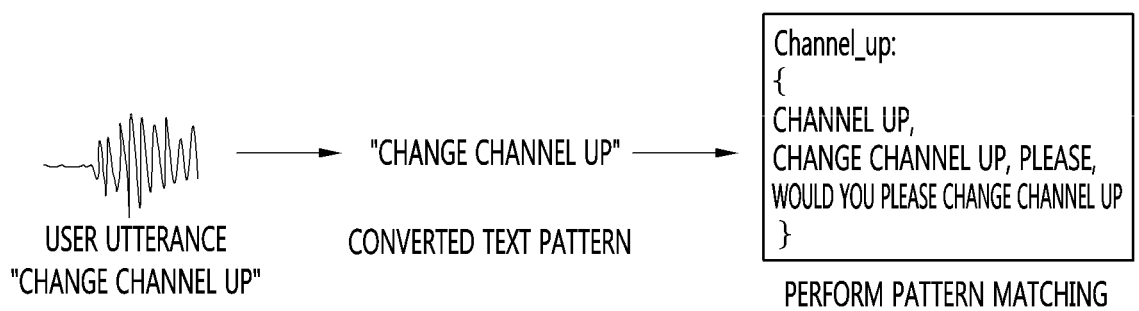

USER UTTERANCE "CHANGE CHANNEL UP" → "CHANGE CHANNEL UP" CONVERTED TEXT PATTERN → PERFORM PATTERN MATCHING

```
Channel_up:
{
CHANNEL UP,
CHANGE CHANNEL UP, PLEASE,
WOULD YOU PLEASE CHANGE CHANNEL UP
}
```

FIG. 6

NLP Response
```
{
command : tv_control,
action : channel_up
}
```

FIG. 7

```
NLP DB
{
command : tv_control,
action : channel_up
userUtternace : [
    "CHANNEL UP",
    "CHANGE CHANNEL UP, PLEASE",
    "CHANGE CHANNEL UP"
    //ADD "CHANGE CHANNEL UP"
    //AS NEW PATTERN
]
}
```

FIG. 8

```
Embedded STT DB
[
  "CHANNEL UP"
  "CHANGE CHANNEL UP, PLEASE",
  "CHANGE CHANNEL UP"
  //ADD "CHANGE CHANNEL UP"
]
```

FIG. 9
USER UTTERANCE Log=
{
　　"CHANGE CHANNEL UP":14.
　　"CHANGE CHANNEL UP, PLEASE : 1,
　　"HOW ABOUT CHANGE CHANNEL UP : 2,
}
FIG. 10
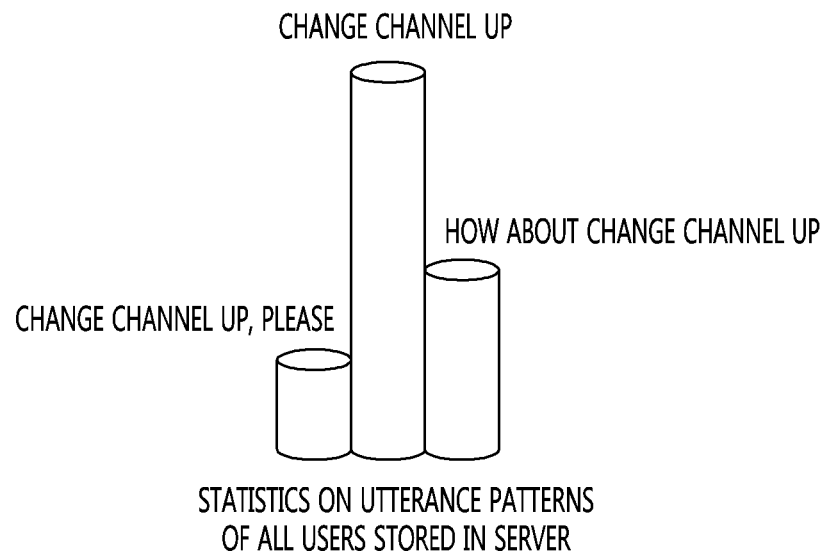
STATISTICS ON UTTERANCE PATTERNS
OF ALL USERS STORED IN SERVER
FIG. 11
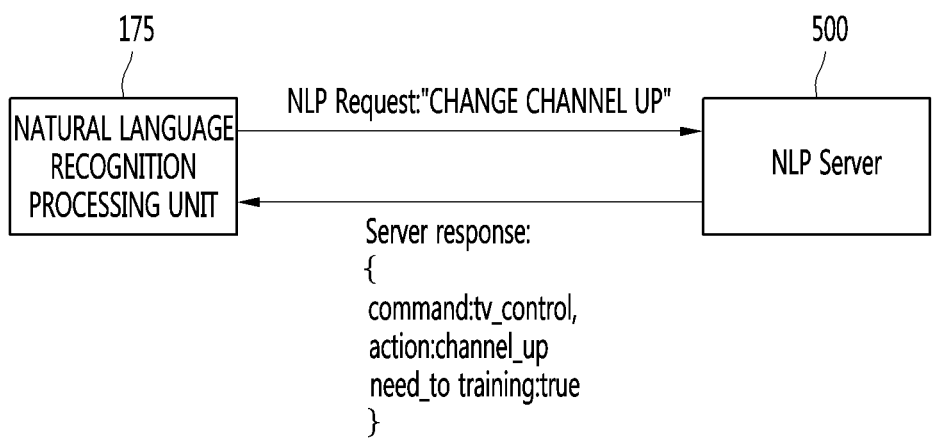

```
User use Pattern (USE TIME)
{
  liveTV:25334.
  webBrower:2212,
  STB : 2234
}
```

```
Get Clickable list
{
    list : [
        "BROADCAST MENU"
        "CHANNEL LIST"
        "RECORDING LIST"
            . . .
```

```
Get Clickable list
{
    list : [
        "PREFERENCE CHANNEL"
        "CHANNEL SETTING"
        "PICTURE QUALITY SETTING"
            . . .
```

DISPLAY DEVICE AND OPERATING METHOD THEREFOR

CROSS-REFERENCE TO RELATED APPLICATIONS

This application is the National Stage filing under 35 U.S.C. 371 of International Application No. PCT/KR2014/010986, filed on Nov. 14, 2014, and also claims the benefit of earlier filing date and right of priority to Korean Patent Application No. 10-2014-0119006 filed on Sep. 5, 2014, the contents of which are all hereby incorporated by reference herein in their entirety.

TECHNICAL FIELD

The present invention relates to a display device and an operating method thereof, and more particularly, to a display device for performing a function corresponding to a voice command without any association with a server by storing voice commands frequently uttered by a user, and an operating method of the display device.

BACKGROUND ART

A voice recognition technology is a technology that converts voices uttered by humans into characters, codes, or the like such that terminals can recognize the voices. The voice recognition technology enables characters to be input at a faster speed than if the characters are input through typing. Hence, studies for increasing the accuracy of the voice recognition technology have been actively conducted.

Various technologies are required to enable a machine to understood a natural language and perform a natural dialog. First, speech to text (STT) for converting voices of a human into texts is preceded such that the machine and the human communicate with each other using sounds. If a voice of a user is converted into a text through STT, the input text is analyzed in various forms. It is analyzed what does the voice of the user means or which intention does the voice of the user possess. Then, if it is analyzed that the user has asked a question about a certain object, an answer desired by the user is searched using searching and semantic technologies. After that, a language generating process of finally creating the answer to the question of the user in a sentence form is performed, and the answer is delivered to the user as a voice through text to speech (TTS) contrary to STT.

However, typically, a natural language recognition processing process is performed in only a server. Hence, in order to execute a voice command for controlling a TV, the TV is always required to be associated with the server. There is a problem in that the association between the TV and the server increases the time required to execute the voice command.

DISCLOSURE OF THE INVENTION

Technical Problem

An object of the present invention is to provide a display device capable of reducing the time required to execute a function of the display device, corresponding to a voice command, by storing voice commands frequently uttered by a user without any association with a server so as to control the function of the display device, and an operating method of the display device.

Technical Solution

According to an embodiment of the present invention, there is provided a method for operating a display device, the method including: receiving a voice command of a user; if a function of the display device, corresponding to the received voice command, is not stored, and the voice command is received at a reference frequency or more, storing the voice command; and if the voice command is again received, performing the function of the display device, corresponding to the again received voice command.

According to an embodiment of the present invention, there is provided a display device including: a storage unit; a network interface unit configured to provide an interface for connection to the outside through a wired/wireless network; a voice recognition unit configured to receive a voice command of a user; and a control unit configured to, if a function of the display device, corresponding to the received voice command, is not stored, and the voice command is received at a reference frequency or more, store the voice command, and, if the voice command is again received, perform the function of the display device, corresponding to the again received voice command.

According to various embodiments of the present invention, the display device is not required to be associated with a server so as to control a function of the display device using a voice command, so that it is possible to reduce the time required to execute the function of the display device, corresponding to the voice command.

Further, according to various embodiments of the present invention, a user-customized voice recognition service can be provided based on a pattern of a voice command uttered by a specific user.

BRIEF DESCRIPTION OF THE DRAWINGS

FIG. 3 is a flowchart illustrating an operating method of the voice recognition system according to an embodiment of the present invention.

FIG. 4 illustrates a process of performing pattern matching to convert a voice command into a text according to an embodiment of the present invention.

FIG. 5 illustrates a process of checking whether a text pattern corresponding to a voice command of a user has matched with a voice recognition pattern stored in an NLP DB according to an embodiment of the present invention.

FIG. 6 illustrates a syntax constituting an intention analysis result representing a result of an utterance intention of a user according to an embodiment of the present invention.

FIGS. 7 and 8 illustrate an example in which a pattern corresponding to a voice command of a user is added to the NLP DB and an STT DB according to an embodiment of the present invention.

FIGS. 9 to 12 are views illustrating an embodiment of analyzing a pattern of a voice command frequently uttered by a user and performing, by itself, natural language recognition processing on the basis of an analysis result.

FIGS. 13 to 15 illustrate an embodiment of selecting, as a training target, a menu item selectable in an application or menu frequently used in the display device.

MODE FOR CARRYING OUT THE INVENTION

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote controller as an internet function is added while fulfilling the broadcast receiving function. Then, with the support of a wired or wireless internet function, it is possible to perform an e-mail, web browsing, banking, or game function in access to internet and computers. In order for such various functions, standardized general purpose OS can be used.

Accordingly, since various applications are freely added or deleted on a general purpose OS kernel, a display device described in this present invention, for example, can perform various user-friendly functions. The display device, in more detail, can be network TV, HBBTV, smart TV, LED TV, OLED TV, and so on and in some cases, can be applied to a smartphone.

Figure 1:
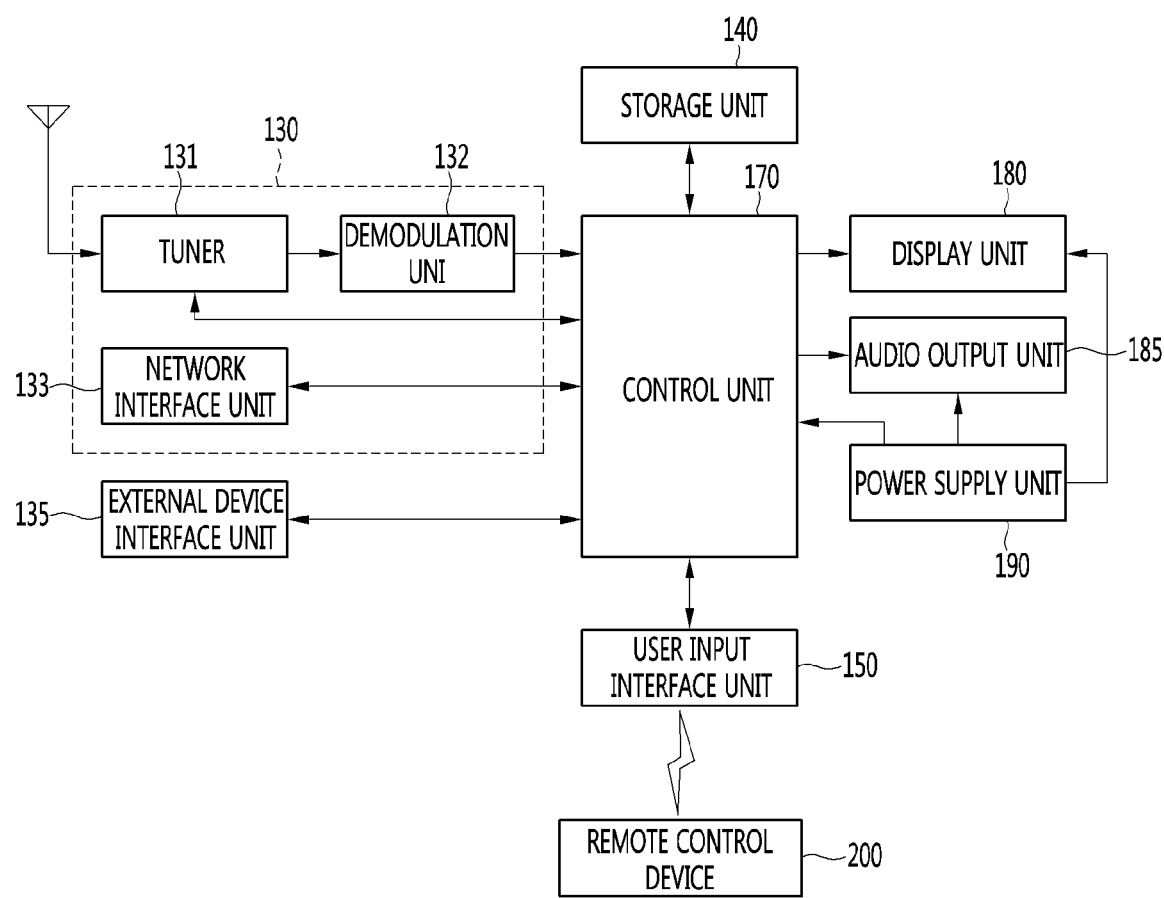
FIG. 1. 1 is a block diagram illustrating a configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user input interface unit 150, a control unit 170, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface 135 can provide a connection path between the display device 100 and an external device. The external device interface 135 can receive at least one of image and audio outputted from an external device that is wirelessly or wiredly connected to the display device 100 and deliver it to the control unit. The external device interface unit 135 can include a plurality of external input terminals. The plurality of external input terminals can include an RGB terminal, at least one High Definition Multimedia Interface (HDMI) terminal, and a component terminal.

The network interface unit 133 can provide an interface for connecting the display device 100 to a wired/wireless network including internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily store image, voice, or data signals outputted from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user input interface unit 150 can deliver, to the control unit 170, control signals inputted from local keys (not shown) such as a power key, a channel key, a volume key, and a setting key.

Image signals that are image-processed in the control unit 170 can be inputted to the display unit 180 and displayed as an image corresponding to corresponding image signals. Additionally, image signals that are image-processed in the control unit 170 can be inputted to an external output device through the external device interface unit 135.

Voice signals processed in the control unit 170 can be outputted to the audio output unit 185. Additionally, voice signals processed in the control unit 170 can be inputted to an external output device through the external device interface unit 135.

Besides that, the control module 170 can control overall operations in the display device 100.

Additionally, the control unit 170 can control the display device 100 by a user command or internal program inputted through the user input interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are inputted through the external device interface unit 135, through the display unit 180 or the audio output unit 185.

Moreover, the control unit 170 can control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content inputted from the outside, and the content can be in various formats such as broadcast images, external input images, audio files, still images, accessed web screens, and document files.

The display unit 180 can convert image signals, data signals, or OSD signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Next, a voice recognition system according to an embodiment of the present invention will be described with reference to FIG. 2.

Figure 2:
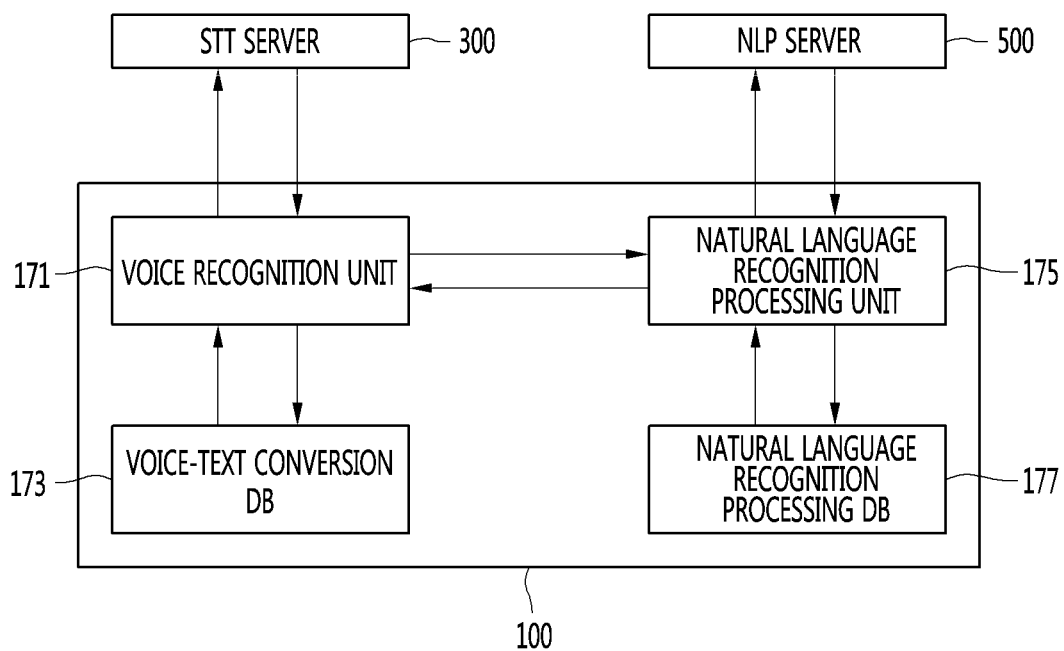
FIG. 2 is a diagram illustrating a voice recognition system according to an embodiment of the present invention.

Referring to FIG. 2, the voice recognition system 10 may include the display device 100, a speech to text server (STT server) 300, and a natural language server (NLP server) 500.

The display device 100 may provide an interface for wired/wireless network connection to the STT server 300 and the NLP server 500 through the network interface unit 133.

The display device 100 may further include a voice recognition unit 171, a speech to text DB (STT DB) 173, a natural language recognition processing unit 175, and a natural language recognition processing DB (NLP DB) 177, in addition to the components illustrated in FIG. 1.

The voice recognition unit 171 may include a voice input unit such as a microphone to receive a voice command of a user. The voice input unit may be provided as a component separate from the voice recognition unit 171. The voice input unit may be included in the user input interface unit 150 described in FIG. 1. The voice recognition unit 171 may process a voice command input through a microphone to electrical voice data.

The STT DB 173 may store a corresponding relationship between voice commands and text patterns corresponding thereto.

The natural language recognition processing unit (NLP client) 175 may receive a converted text pattern from the voice recognition unit 171, and check whether the text pattern matches with a prestored voice recognition pattern. As a matching result of the NLP client 175, if the text pattern matches with the prestored voice recognition pattern, the control unit 170 may perform a function of the display device 100, corresponding to the matched voice recognition pattern.

The NLP DB 177 may store a corresponding relationship between functions of the display device 100 and voice recognition patterns corresponding thereto.

The voice recognition unit 171, the STT DB 173, the NLP client 175, and the NLP DB 177 may be included in the control unit 170. The STT server 300 may convert a voice command received from the voice recognition unit 171 into a text pattern (S109), and transmit the converted text pattern to the voice recognition unit 171.

The NLP server 500 may analyze an intention of the user with respect to the text pattern according to an intention analysis request received from the NLP client 175 (S119), and transmit an intention analysis result to the NLP client 175.

Next, an operating method of the voice recognition system according to an embodiment of the present invention will be described with reference to FIG. 3.

FIG. 3 is a flowchart illustrating an operating method of the voice recognition system according to an embodiment of the present invention.

The voice recognition unit 171 of the display device 100 receives a voice command of a user (S101). The voice recognition unit 171 may include a voice input unit such as a microphone to receive the voice command of the user. The voice input unit may be provided as a component separate from the voice recognition unit 171. The voice input unit may be included in the user input interface unit 150 described in FIG. 1. The voice recognition unit 171 may process a voice command input through a microphone to electrical voice data.

In an embodiment, the voice recognition unit 171 may receive the voice command of the user in a state in which a network of the display device 100 is blocked. The state in which the network of the display device 100 is blocked may represent a state in which the network of the display device 100 is not connected to the STT server 300 and the NLP server 500.

In another embodiment, the voice recognition unit 171 may receive the voice command of the user in a state in which the network of the display device 100 is connected. The state in which the network of the display device 100 is connected may represent a state in which the network of the display device 100 is connected to the STT server 300 and the NLP server 500.

The voice recognition unit 171 of the display device 100 may determine whether text data corresponding to the receive voice command has matched with a prestored text pattern in the STT DB 173 (S103). The voice recognition unit 171 may search the STT DB 173 to check whether text data corresponding to the receive voice command has matched with a prestored text pattern. The STT DB 173 may store a corresponding relationship between a plurality of voice commands and a plurality of text patterns. The voice recognition unit 171 may determine whether text data corresponding to the receive voice command has matched with each of the plurality of text patterns by searching the STT DB 173. This will be described with reference to FIG. 4.

FIG. 4 illustrates a process of performing pattern matching to convert a voice command into a text according to an embodiment of the present invention.

If the user utters a voice called "Change the channel up," the voice recognition unit 171 receives a voice command called "Change the channel up," and converts the received voice command into text data. The voice recognition unit 171 performs a matching process between text patterns stored in the STT DB 173 and text data corresponding to the voice command. It is assumed that the text patterns stored in the STT DB 173 are (NBC, PBS, SOS, and ABS). The voice recognition unit 171 may determine similarities representing degrees of similarities between the text data corresponding to the voice command and the stored text patterns. If a similarity between the text data corresponding to the voice command and a prestored text pattern exceeds a threshold similarity, the voice recognition unit 171 may determine that the text data has matched with the corresponding prestored text pattern. If a similarity between the text data corresponding to the voice command and a prestored text pattern is less than the threshold similarity, the voice recognition unit 171 may determine that the text data has not matched with the corresponding prestored text pattern. Referring to FIG. 4, a reference similarity may be set to a value of 4000. The text data corresponding to voice command called "Change the channel up" has a similarity of 1000 with NBC that is a prestored text pattern, a similarity of 2500 with PSB that is a prestored text pattern, a similarity of 2000 with SOS that is a prestored text pattern, and a similarity of 1560 with ABS that is a prestored text pattern, which do not exceed the 4000 that is the reference similarity. Accordingly, the voice recognition unit 171 can determine that the text data corresponding to voice command called "Change the channel up" has not matched with the prestored text patterns. That is, the voice recognition unit 171 does not recognize the voice command called "Change the channel up," uttered by the user.

Again, FIG. 3 will be described.

As a determination result, if the text data corresponding to the voice command matches with the prestored text pattern, the voice recognition unit 171 of the display device 100 transmits an intention analysis request for intention analysis of the text data to the NLP server 500 (S117).

As a determination result, if the text data corresponding to the voice command does not match with the prestored text pattern, the voice recognition unit 171 of the display device 100 transmits the voice command to the STT server 300 (S107). The voice recognition unit 171 may transmit a voice signal corresponding to the voice command to the STT server 300 so as to acquire a text pattern corresponding to the voice command. In an embodiment, if the text data corresponding to the voice command does not matches with the prestored text pattern, the control unit 170 of the display device 100 may output that there exists no text pattern corresponding to the voice command. The outputting may be performed using various notification methods including a message, a sound, and the like. In addition, if the text data corresponding to the voice command does not matches with the prestored text pattern, the control unit 170 of the display device 100 may output that a function of the display device 100, corresponding to the voice command, cannot be performed.

The STT server 300 converts the voice command received from the voice recognition unit 171 into a text pattern (S109), and transmits the converted text pattern to the voice recognition unit 171 (S111). The STT server 300 may store a corresponding relationship between voice commands of the user and text patterns corresponding thereto.

The NLP client 175 of the display device 100 receives the converted text pattern from the voice recognition unit 171, and checks whether the text pattern has matched with a prestored voice recognition pattern (S113).

The NLP client 175 may check whether the text pattern has matched with a prestored voice recognition pattern so as to perform a function of the display device 100, corresponding to the text pattern. In an embodiment, the NLP DB 177 may store a corresponding relationship between functions of the display device 100 and voice recognition patterns corresponding thereto. One function of the display device 100 may correspond to a plurality of voice recognition patterns. The NLP client 175 may compare each of a plurality of voice recognition patterns stored in the NLP DB 177 with the received text pattern and check whether the text pattern has matched with the voice recognition pattern. This will be described with reference to FIG. 5.

FIG. 5 illustrates a process of checking whether a text pattern corresponding to a voice command of a user has matched with a voice recognition pattern stored in the NLP DB according to an embodiment of the present invention.

Referring to FIG. 5, if the user utters a voice called "Change the channel up," the NLP client 175 acquires a text pattern corresponding to the voice command called "Change the channel up" through the process of FIG. 3. The NLP DB 177 stores a plurality of voice recognition patterns, i.e., patterns called "Channel up," "Change the channel up, please," and "Would you please change the channel up," which correspond to a stored channel-up function. Since the text pattern called "Change the channel up" is not stored in the NLP DB 177, the NLP client 175 may check that the text pattern corresponding to the voice command has not matched with the voice recognition pattern stored in the NLP DB 177. Accordingly, the display device 100 cannot recognize the corresponding voice command and thus cannot perform a function of the display device 100.

Again, FIG. 3 will be described.

As a matching result, if the text pattern matches with the prestored voice recognition pattern, the control unit 170 performs a function of the display device 100, corresponding to the matched voice recognition pattern (S115).

As a matching result, if the text pattern does not match with the prestored voice recognition pattern, the NLP client 175 transmits, to the NLP server 500, an intention analysis request for analyzing an intention of the corresponding text pattern (S117).

In an embodiment, the NLP client 175 may check a use frequency of a text pattern corresponding to the voice command of the user. If the use frequency of the text pattern corresponding to the voice command exceeds a reference user frequency, the NLP client 175 may request the NLP server 500 of intention analysis on the text pattern. This will be described in detail with reference to FIG. 9.

In another embodiment, the user frequency of the text pattern corresponding to the voice command may be checked by the NLP server 500. This will be described in detail with reference to FIG. 10.

In an embodiment, if a text pattern does not matches with a prestored voice recognition pattern, the control unit 170 of the display device 100 may output that a function of the display device 100, corresponding to the text pattern cannot be performed. After it is output that the function of the display device 100, corresponding to the text pattern cannot be performed, the NLP client 175 may transmit an intention analysis request to the NLP server 500.

The NLP server 500 analyzes an intention of the user with respect to the text pattern according to the intention analysis request received from the NLP client 175 (S119), and transmits an intention analysis result to the NLP client 175 (S121). Here, the intention of the user may represent a purpose of allowing the display device 100 to perform a specific function. The NLP server 500 may check which function of the display device 100 the received text pattern controls. The NLP server 500 may analysis the intention of the user with respect to the text pattern using a natural language recognition processing technique known in the art. The NLP server 500 may detect an intention of the user through morpheme analysis, syntax analysis, speech act analysis, and dialog processing analysis. The morpheme analysis is a process of dividing a text pattern into morpheme units that are smallest meaning units and detecting which part of speech each morpheme has. The syntax analysis is a process of analyzing a text pattern on the basis of a specific reference such as a noun phrase, a verb phrase, or an adjective phrase, using a morpheme analysis result, and detecting which relationship exists between divided phrases. A subjective, an objective, and qualifiers of a voice command may be detected through the syntax analysis. The speech act analysis is a process of analyzing an utterance intention of a user to check whether the user asks a question, requests information, or expresses a simple emotion. If the utterance intention of the user is detected, there is performed a dialog processing process for an appropriate answer, such as a process of answering a voice command of the user, a process of making a response, or a process of taking an action desired by the user.

In another embodiment, the intention analysis of the user does not pass through the NLP server 500 but may be performed by the NLP client 175.

The intention analysis result that the NLP server 500 transmits to the NLP client 175 may include a syntax as illustrated in FIG. 6.

FIG. 6 illustrates a syntax constituting an intention analysis result representing a result of an utterance intention of a user according to an embodiment of the present invention.

Referring to FIG. 6, the intention analysis result that is a response of the NLP server 500 may include a command field and an action field. The command field is a field representing which device a voice command of a user is used to control. For example, command: tv_control representing that the voice command of the user is used to control a function of a TV (display device) may be used as the command field. The action field is a field representing which function of the corresponding device is to be performed. For example, action: channel_up representing channel-up of the TV may be used as the action field.

Again, FIG. 3 will be described.

The NLP client 175 of the display device 100 matches a text pattern corresponding to the voice command with a function of the display device 100, corresponding to the text pattern on the basis of the received intention analysis result, and store the matched result in the NLP DB 177 (S123). That is, the NLP client 175 may a text pattern corresponding to a voice command of the user, which is not stored, to match with the corresponding function. Accordingly, the NLP client 175 of the display device 100 can acquire an intention analysis result for a text pattern corresponding to the voice command of the user without requesting the NLP server 500 of the intention analysis result, and immediately perform a function of the display device 100, corresponding to the voice command.

In an embodiment, the NLP client 175 may transmit, to the voice recognition unit 171, a request for adding the text pattern corresponding to the voice command of the user, acquired based on the intention analysis result, to the STT DB 173. The voice recognition unit 171 may store a text pattern corresponding to the voice command of the user in the STT DB 173 according to the received request. An example in which a text pattern corresponding to the voice command of the user is added to the NLP DB 177 and the STT DB 173 will be described with reference to FIGS. 7 and 8.

FIGS. 7 and 8 illustrate an example in which a pattern corresponding to a voice command of a user is added to the NLP DB and the STT DB according to an embodiment of the present invention.

Referring to FIG. 7, the NLP DB 177 may additionally store "Change the channel up" in addition to "Channel up" and "Change the channel up, please," which were prestored as utterance voices of the user, corresponding to the channel-up function of the display device 100. That is, it can be seen that a voice recognition pattern called "Change the channel up" has been added to the channel-up function of the display device 100.

Referring to FIG. 8, the STT DB 173 may additionally store a text pattern called "Change the channel up" in addition to "Channel up" and "Change the channel up, please," which are prestored text patterns.

Again, FIG. 3 will be described.

The voice recognition unit 171 of the display device 100 check whether the voice command received in step S101 has been again received (S125). If the voice command is again received, the voice recognition unit 171 performs a function of the display device 100, corresponding to the voice command (S127).

According to the embodiment of the present invention, even if a text pattern corresponding to a voice command uttered by the user does not match with a prestored voice recognition pattern, the display device 100 can store the corresponding voice command and a function corresponding thereto. Accordingly, if the voice command is again input, the display device 100 can recognize the corresponding voice command without any association with the STT server 300 and the NLP server 500, and perform, by itself, natural language recognition processing on the recognized voice command.

Next, an embodiment of analyzing a pattern of a voice command frequently uttered by a user and performing, by itself, natural language recognition processing on the basis of an analysis result will be described with reference to FIGS. 9 to 12.

FIG. 9 is a view illustrating a reference where the display device analyzes an utterance pattern of a user and select a training target to perform, by itself, natural language recognition processing on a voice command according to an embodiment of the present invention.

The reason of selecting a training target is for the purpose of, if a voice command frequently uttered by the user exists but corresponds to a voice recognition pattern that is not stored in the NLP DB 177 of the display device 100, performing, by itself, natural language recognition processing on the frequently uttered voice command without any association with a server.

In an embodiment, the display device 100 may select a specific voice command as a training target on the basis of a user utterance log. As the voice command that becomes the training target, a voice recognition pattern that is not stored in the NLP DB 177 of the display device 100 may become a candidate. Referring to FIG. 9, the control unit 170 of the display device 100 may frequently store voice commands uttered by the user, and generate a user utterance log on the basis of a storage result. The control unit 170 of the display device 100 may store an utterance log of the user for each function of the display device 100. FIG. 9 illustrates an utterance log of the user, corresponding to the channel-up function. Referring to FIG. 9, since "Change the channel up" among voice commands included in the utterance log of the user is most frequently uttered as 14 times, the control unit 170 of the display device 100 may select "Change the channel up" as a training target. In another embodiment, the control unit 170 of the display device 100 may select, as a training target, a voice command uttered a preset number of times or more among the voice commands included in the utterance log of the user.

Next, FIG. 10 will be described.

FIG. 10 is a view illustrating a reference where the NLP server analyzes an utterance pattern of a user and selects a training target to perform, by itself, natural language recognition processing on a voice command according to an embodiment of the present invention.

The NLP server 500 may receive voice commands uttered by a plurality of users from a plurality of display devices corresponding to the respective users. The NLP server 500 may select, as a training target, a most frequently uttered voice command among voice commands corresponding to a specific function of the display device 100. For example, the NLP server 500 may analyze stored utterance pattern of all the users and select, as a training target, "Change the channel up" that is a most frequently uttered voice command. In another embodiment, the NLP server 500 may select, as a training target, a voice command uttered a preset number of times or more among the stored voice commands.

Next, FIGS. 11 and 12 will be described.

First, FIG. 11 illustrates an embodiment of training a selected voice command.

Referring to FIG. 11, the NLP client 175 may transmit, to the NLP server 500, a selection request for selecting, as a training target, a text pattern corresponding to the voice command (Change the channel up) selected by the display device 100. The NLP server 500 may transmit, to the NLP client 175, a selection response notifying that a text pattern called "Change the channel up" has been selected as a training target, corresponding to the selection request. The selection response may include a command field representing a function of the display device 100, an action field representing the channel-up function of the display device 100, and a training request (need_to_training) field notifying that a text pattern has been selected as a training target.

Figures 12, 13:
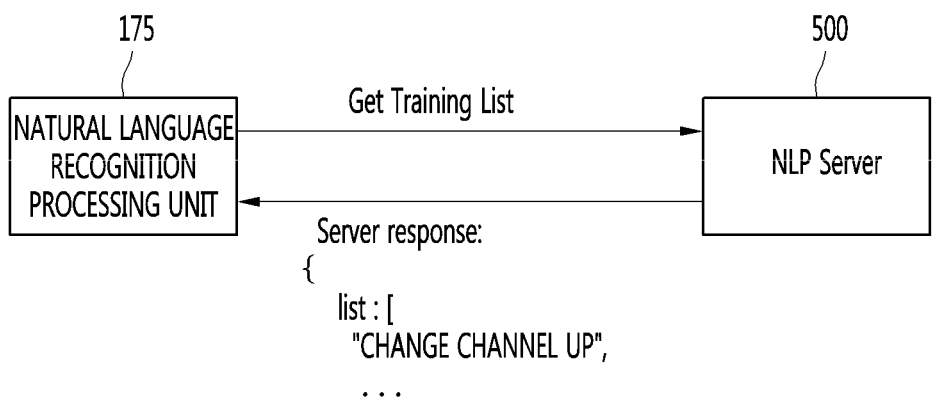

FIG. 12 illustrates an embodiment in which the display device acquires a list of voice commands on which training is performed from the NLP server.

Referring to FIG. 12, the NLP client 175 may transmit, to the NLP server 500, a training list request (Get training list) for requesting a list of voice commands on which training is performed. The NLP server 500 may transmit, to the NLP client 175, a list response including the voice commands on which the training is performed according to the training list request. The NLP client 175 may add a text pattern corresponding to the voice command on which the training is performed to a voice recognition pattern corresponding to the function of the display device 100 on the basis of the received list response in NLP DB 177. Also, the NLP client 175 may transmit, to the voice recognition unit 171, a request for storing, in the STT DB 173, a text pattern corresponding to the voice command on which the training is performed. The voice recognition unit 171 may store, in the STT DB 173, a text pattern corresponding to the voice command on which the training is performed according to the request received from the NLP client 175. Accordingly, if an added voice command is received, the display device 100 can perform natural language recognition processing on the voice command without any association with the STT server 300 and the NLP server 500.

Next, an embodiment of selecting, as a training target, a menu item selectable in an application or menu frequently used in the display device will be described with reference to FIGS. 13 to 15.

The display device 100 may generate a use pattern log on the basis of a use pattern of a user. In an embodiment, the use pattern may represent a time for which the user uses a specific application of the display device 100 during a preset period. For example, as shown in FIG. 13, the use pattern log includes 25334 that is a time for which a liveTV application is used, 2212 that is a time for which a webBrowser application is used, and 2234 that is a time for which an STB application is used. The control unit 170 of the display device 100 may select, as the base of a training target, the liveTV application that is a most frequently used application, based on the use pattern log.

Figure 14:
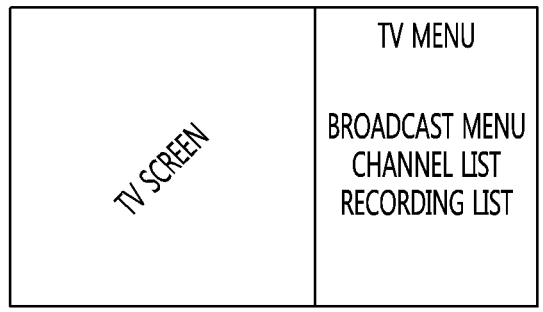

FIG. 14 illustrates an execution screen of the liveTV application. The execution screen of the liveTV application may include a broadcast reproduction screen and a TV menu screen. The TV menu screen may include a broadcast menu, a channel list, and a recording list. Each of the broadcast menu, the channel list, and the recording list may be a text clickable by a user input.

The control unit 170 of the display device 100 may select text patterns called "Broadcast menu," "Channel list," and "Recording list," which are included in the TV menu screen, as training targets for natural language recognition processing. The control unit 170 may generate a training selection list including "Broadcast menu," "Channel list," and "Recording list," which are included in the TV menu screen, and transmit the generated training selection list to the NLP server 500. The display device 100 may receive, from the NLP server 500, a training result obtained by performing the natural language processing on the training selection list, and store the received training result in the NLP DB 177.

Figure 15:
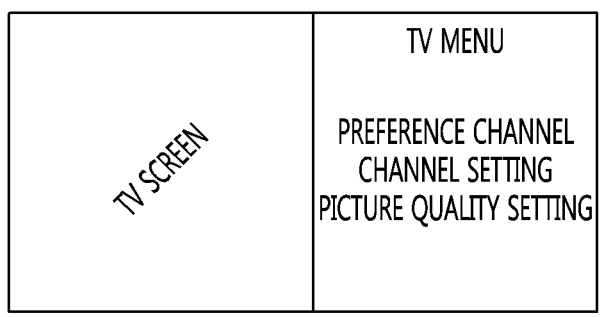

Meanwhile, if "Broadcast menu" is selected on the TV menu screen of FIG. 14, the display device 100, as shown in FIG. 15, may display lower items of the broadcast menu. The lower items of the broadcast menu may include a preference channel, a channel setting, and a picture quality setting. The control unit 170 of the display device 100 may select text patterns called "Preference channel," "Channel setting," and "Picture quality setting," which are the lower items of the broadcast menu, as training targets for natural language processing. The control unit 170 may generate a training selection list including "Preference channel," "Channel setting," and "Picture quality setting," which are the lower items of the broadcast menu, and transmit the generated training selection list to the NLP server 500. The display device 100 may receive, from the NLP server 500, a training result obtained by performing the natural language processing on the training selection list, and store the received training result in the NLP DB 177. If a user utters a voice command called "Broadcast menu" during using the liveTV application, the display device 100 may receive the uttered "Broadcast menu" and display the lower items of the broadcast menu. In addition, if the user utters a voice command called "Preference channel," the display device 100 may receive the uttered "Preference channel" and display a preference channel list. That is, the display device 100 may immediately perform a function corresponding to the voice command without any association with the NLP server 500, based on a training result of the voice command.

Next, FIG. 16 will be described.

Figure 16:
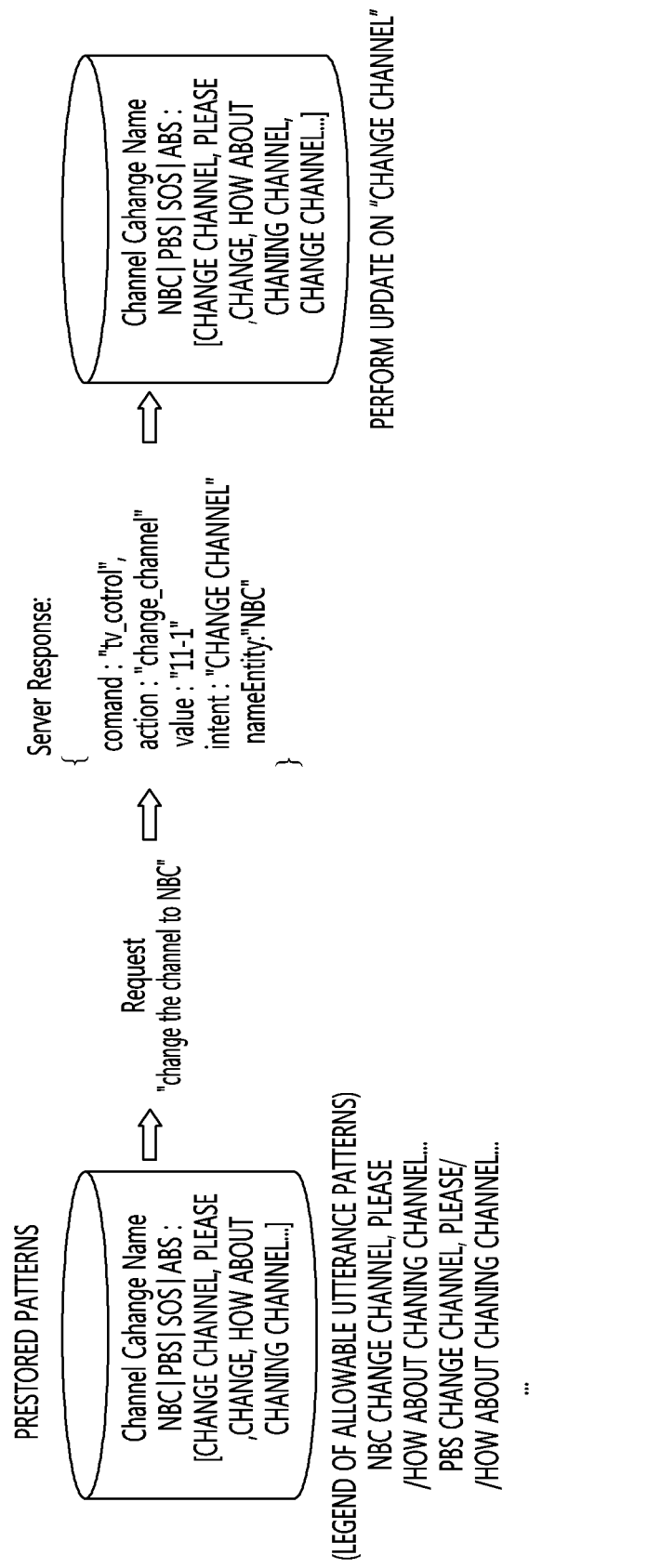
FIG. 16 is a view illustrating a process in which the NLP server performs intention analysis on a voice command of a user and updates an intention analysis result in the display device according to an embodiment of the present invention.

FIG. 16 is a view illustrating a process in which the NLP server performs intention analysis on a voice command of a user and updates an intention analysis result in the display device according to an embodiment of the present invention.

The NLP DB 177 may store a voice recognition pattern corresponding to a channel changing function of the display device 100. The voice recognition pattern may be divided into an intention part and a target part to be stored in the NLP DB 177. For example, a voice recognition pattern called "Change the channel to NBC" may be divided into an intention part representing a channel change called "Change the channel" and a target part representing a specific channel called "NBC" to be stored in the NLP DB 177. As the voice recognition pattern is divided into the intention part and the target part, an utterance pattern on which natural language recognition processing can be performed may be configured as a combination of the intention part and the target part, such as "Change the channel to NBC, please," "How about changing the channel to NBC," "Change the channel to PBC, please," or "How about changing the channel to PBC."

Meanwhile, if the NLP client 175 of the display device 100 requests the NLP server 500 of performing an intention analysis of a voice command called "Change the channel to NBC," the NLP server 500 may transmit an intention analysis result to the NLP client 175 in response to the request. The intention analysis result may include a command field, an action field, a channel number (value) field, an intention (intent) field, and a target (nameEntity) field. The channel number field may be a field representing a channel number corresponding to the channel called "NBC." The intention field may be a field representing an intention detection result in which the channel is to be changed. The target field may be a field representing the name of a channel to be changed. The NLP client 175 may store the intention analysis result received from the NLP server 500 in the NLP DB 177. The NLP client 175 may divide a voice recognition pattern corresponding to the voice command into an intention part and a target part to be updated in the NLP DB 177, based on the intention analysis result.

According to the embodiment of the present invention, the display device 100 may detect a frequency at which a specific voice command is received regardless of which user utters. Then, if the detected frequency is a reference frequency or more, the display device 100 may acquire and store a corresponding relationship among the specific voice command, a text pattern corresponding to the specific voice command, a voice recognition pattern corresponding to the specific voice command, and a function of the display device 100, corresponding to the specific voice command. Accordingly, although any user utters a specific voice command, the display device 100 can immediately performing a function corresponding to the specific voice command without any association with the STT server 300 and the NLP server 500.

Further, according to the embodiment of the present invention, the display device 100 may provide a user-customized voice recognition service for each user. For example, the display device 100 may identify a user, based on a voice component of a voice command of a user. The display device 100 may receive the same voice command plural times from the identified user. If the frequency at which the corresponding voice command is received is the reference frequency or more, the display device 100 may acquire a text pattern corresponding to the voice command and an intention analysis result of the text pattern as illustrated in FIG. 2. In this case, although the same voice command is received at the reference frequency or more by different users, the display device 100 may not store a function of the display device 100, corresponding to the voice command. That is, if a specific user utters a voice command at the reference frequency or more, the display device 100 may acquire an intention analysis result of the uttered voice command. The display device 100 may acquire and store a corresponding relationship among the specific user, the voice command of the specific user, and a function of the display device 100, corresponding to the voice command of the specific user, based on the intention analysis result. Accordingly, the display device can provide a voice recognition service suitable for a specific user.

According to an embodiment of the present invention, the foregoing method can be implemented as codes readable by a processor on a medium written by the program. Examples of the computer-readable media can include ROM, RAM, CD-ROM, magnetic tape, floppy disk, and optical data storage device, and the like, and also include a device implemented via a carrier wave (for example, a transmission via the Internet).

The remote control device described above will not be applicable in a limited way to the configurations and methods of the above-described embodiments, and all or part of each embodiment can be selectively combined and configured to make various modifications thereto.

The invention claimed is:

1. A display device comprising:
   a memory;
   a display;
   a network interface unit configured to communicate via a network;
   a voice recognition unit; and
   a control unit configured to:
   transmit, via the network interface unit, a text selectable by a user input included in an execution screen of an application to a server when the application is executed at the display device a predetermined number of times;

receive an intent analysis result including a function corresponding to the text;

store the intent analysis result in the memory;

receive, via the voice recognition unit, a voice command of a user corresponding to the text, and perform the function corresponding to the text based on the intent analysis result.

2. The display device according to claim 1, wherein the control unit selects the text included in the execution screen in response to the received voice command.

3. The display device according to claim 2, wherein the text represents a menu and the control unit is further configured to display, on the display, a plurality of lower menu items of the menu according to a selection of the text.

4. The display device according to claim 3, wherein the plurality of lower menu items includes a preference channel item, a channel setting item, and a picture quality setting item.

* * * * *